(12) United States Patent
Mandokoro (10) Patent No.: US 9,696,186 B2
(45) Date of Patent: Jul. 4, 2017

(54) POSITION DETECTING SENSOR

(71) Applicant: SMC CORPORATION, Chiyoda-ku (JP)

(72) Inventor: Jiro Mandokoro, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 20 days.

(21) Appl. No.: 14/662,670

(22) Filed: Mar. 19, 2015

(65) Prior Publication Data

US 2015/0316396 A1    Nov. 5, 2015

(30) Foreign Application Priority Data

Apr. 30, 2014    (JP) .................. 2014-093343

(51) Int. Cl.
*G01D 11/24*    (2006.01)
*F15B 15/28*    (2006.01)

(52) U.S. Cl.
CPC ........ *G01D 11/245* (2013.01); *F15B 15/2892* (2013.01)

(58) Field of Classification Search
CPC .............................. G01D 11/24; G01D 11/245
USPC .......................................................... 73/431
See application file for complete search history.

(56) References Cited

U.S. PATENT DOCUMENTS

| | | | |
|---|---|---|---|
| 6,917,515 B2* | 7/2005 | Chen ........................ | H02B 1/04 361/600 |
| 7,250,753 B2* | 7/2007 | Terasaki .............. | F15B 15/2807 324/207.21 |
| 7,963,208 B2* | 6/2011 | Terasaki .............. | F15B 15/2892 92/5 R |
| 2002/0014128 A1* | 2/2002 | Kroll ................... | F15B 15/2807 73/866.5 |
| 2008/0022789 A1* | 1/2008 | Okuno ................ | F15B 15/2892 73/866.5 |

FOREIGN PATENT DOCUMENTS

| | | | | |
|---|---|---|---|---|
| DE | 202008007384 U1 | * | 10/2009 | .......... F15B 15/2892 |
| DE | 20 2008 007 384 U1 | | 12/2009 | |
| JP | 06228843 A | * | 8/1994 | |
| JP | 2008-051800 A | | 3/2008 | |
| JP | 2008051800 A | * | 3/2008 | |

* cited by examiner

*Primary Examiner* — Lisa Caputo
*Assistant Examiner* — Jamel Williams
(74) *Attorney, Agent, or Firm* — Oblon, McClelland, Maier & Neustadt, L.L.P.

(57) ABSTRACT

A position detecting sensor is mounted in a sensor attachment groove that opens on a side surface of an actuator and extends in an axial direction of the actuator. The position detecting sensor includes a housing that houses a sensor main body, and a guide member inserted into the sensor attachment groove. The guide member is of a shape such that, when the guide member is inserted into the sensor attachment groove, the guide member is required to be rotated in one direction around an axis parallel with the axis of the actuator and then rotated in a direction opposite to the one direction. After the guide member has been inserted into the sensor attachment groove, attachment thereof to the sensor attachment groove is completed by application of a fastener.

6 Claims, 5 Drawing Sheets

POSITION DETECTING SENSOR

CROSS-REFERENCE TO RELATED APPLICATION

This application is based upon and claims the benefit of priority from Japanese Patent Application No. 2014-093343 filed on Apr. 30, 2014, the contents of which are incorporated herein by reference.

BACKGROUND OF THE INVENTION

Field of the Invention

The present invention relates to a position detecting sensor, and more specifically, to a position detecting sensor that can be attached, for example, to an actuator, so as to be capable of continuously detecting an operating state of the actuator.

Description of the Related Art

Heretofore, for example, in order to detect the position of a piston in the interior of a cylinder that constitutes an actuator, a magnet is mounted on the piston, and a magnetic sensor that detects magnetism from the magnet is arranged on an outer side of the actuator. Upon reciprocal displacement of the piston under the supply of a pressure fluid, the position of the piston can be confirmed by the magnetism from the magnet, which is detected by the magnetic sensor.

In this case, the position detecting sensor is constructed by connecting a cylindrical attachment member to a holder that houses the magnetic sensor, and the position detecting sensor is installed in a sensor groove, which is circular in cross section and opens on a side surface of the cylinder entirely along an axial direction thereof (see Japanese Laid-Open Patent Publication No. 2008-051800).

When the position detecting sensor is installed, at first, the cylindrical attachment member is inserted into the sensor groove from one axial end surface of the cylinder, and the attachment member is moved to a predetermined position along the sensor groove. Thereafter, an amount of tightening of a bolt that connects the holder and the attachment member is adjusted, and mounting of the position detecting sensor is completed by gripping, between the holder and the attachment member, a bulging portion that is formed in the opening of the sensor groove.

SUMMARY OF THE INVENTION

However, with the position detecting sensor of Japanese Laid-Open Patent Publication No. 2008-051800, since mounting of the position detecting sensor with respect to the cylinder is performed by manually inserting the attachment member up to a desired position from one axial end of the cylinder, it is difficult to improve working efficiency, while in addition, a constraint is imposed in that a wide operating space is needed in the vicinity of the axial end of the cylinder.

The present invention has been devised in relation to the aforementioned patent document while taking into consideration the above-noted problems, and has the object of providing a position detecting sensor, which enables mounting of the position detecting sensor with respect to an actuator to be performed easily and effectively, without the need for undue widening of an operating space, and which makes it difficult for the position detecting sensor to become separated from the sensor attachment groove in a state in which the sensor is assembled provisionally onto the actuator.

A position detecting sensor according to the present invention is mounted in a sensor attachment groove that opens on a side surface of an actuator and extends in an axial direction of the actuator. The position detecting sensor includes a housing that houses a sensor main body, and a guide member inserted into the sensor attachment groove. The guide member is of a shape such that, when the guide member is inserted into the sensor attachment groove, the guide member is required to be rotated in one direction around an axis parallel with the axis of the actuator and then rotated in a direction opposite to the one direction. After the guide member has been inserted into the sensor attachment groove, attachment thereof to the sensor attachment groove is completed by application of a fastener.

According to the above position detecting sensor, since the position detecting sensor can be attached from a side surface of the actuator, there is no need for an operating space for mounting the position detecting sensor, in the axial direction of the actuator. In addition, for detaching the guide member from the sensor attachment groove, similar to inserting the guide member in the sensor attachment groove, since an operation of rotating the guide member in one direction and then rotating in a direction opposite to the one direction is required, even in the event that the position detecting sensor is attached with respect to an actuator, which is placed in a state such that the sensor attachment groove thereof opens sideways or downwardly, in a provisionally assembled state prior to application of the fastener, there is no fear that the position detecting sensor will fall out unintentionally from the sensor attachment groove.

In the above-described position detecting sensor, an attachment hole for the fastener preferably is formed to penetrate through the guide member from a side of the housing opposite to the guide member. Consequently, the fastening operation for fixing the guide member in a state of being inserted into the sensor attachment groove can easily be performed.

Further, cutout portions may be formed in both ends in a longitudinal direction of the housing, and the attachment hole may penetrate through the guide member from a bottom surface of each of the cutout portions. Accordingly, since the position detecting sensor is fixed in the sensor attachment groove at both ends thereof, the position detecting sensor can be fastened in a stable manner. Further, since heads of the fasteners are accommodated in the cutout portions, the fasteners do not project outwardly from the housing.

In the position detecting sensor, preferably, the sensor attachment groove includes a first guiding surface having a planar shape and which extends vertically downwardly from a side surface of the actuator, a second guiding surface separated a predetermined distance from the first guiding surface and lying parallel with the first guiding surface, and a third guiding surface that is curved in an arcuate shape and mutually connects terminal end portions, respectively, of the first guiding surface and the second guiding surface. As a result thereof, the guide member can be retained stably in the sensor attachment groove.

Furthermore, the guide member may further include a first guided surface having a planar shape and which extends vertically downwardly from the housing, a second guided surface separated a predetermined distance from the first guided surface and lying parallel with the first guided surface, a third guided surface that bulges in an arcuate shape and is connected to a terminal end portion of the first guided surface, a fourth guided surface that is connected to the second guided surface, slants in a direction to approach the first guided surface, and thereafter, slants in a direction to become parallel again with the second guided surface, and a fifth guided surface that is connected to the fourth guided surface and is substantially parallel with the second guided surface, wherein a terminal end portion of the third guided surface may be connected to a terminal end portion of the fifth guided surface. Owing to this feature of the invention, the cross-sectional widthwise center line of the guide member is drawn in the form of a gently meandering line, thereby enabling a structure in which the position detecting sensor, the guide member of which has been inserted into the sensor attachment groove, cannot become separated from the sensor attachment groove simply by tilting the position detecting sensor in one direction.

Further, an interval between the first guided surface and the second guided surface may be substantially equal to a maximum wall thickness between the third guided surface and the fifth guided surface, and may be slightly less than an interval between the first guiding surface and the second guiding surface, and a radius of curvature of the third guided surface may be substantially equal to a radius of curvature of the third guiding surface. Accordingly, when the guide member is inserted into the sensor attachment groove, tilting of the guide member can be permitted. Further, in particular, when fasteners are applied, the third guided surface of the guide member is pressed into contact with the third guiding surface of the sensor attachment groove, whereby the position detecting sensor can easily be fixed to the cylinder main body.

In the position detecting sensor, the actuator may be a cylinder apparatus. In this case, the cylinder apparatus may include a piston in which a magnet is installed, in the interior of a cylinder main body, and a plurality of magnetic sensors may be accommodated in the housing along a longitudinal direction of the housing. According to such a structure, it is possible for the position of the piston to be finely detected within a stroke range of the piston.

Furthermore, the fastener may be a male screw thread. In accordance with this feature, the fasteners can be constructed easily, and the retaining force that holds the position detecting sensor with respect to the sensor attachment groove can easily be adjusted.

According to the above position detecting sensor of the present invention, since the position detecting sensor can be attached from a side surface of the actuator, there is no need to provide an operating space for mounting the position detecting sensor in the axial direction of the actuator. Further, in a state in which the position detecting sensor is provisionally assembled onto the actuator, there is no fear that the position detecting sensor will fall out unintentionally from the sensor attachment groove.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 4:
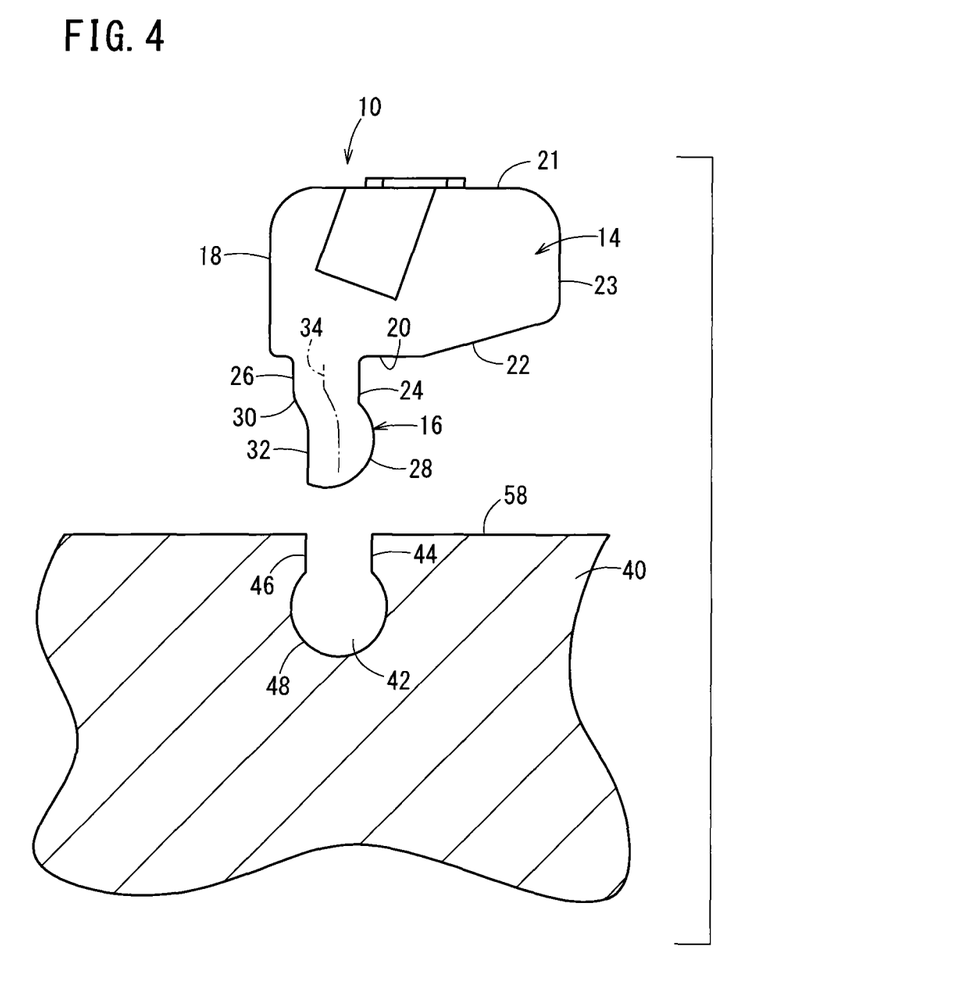
FIG. 4 is a schematic side illustration of the position detecting sensor shown in FIG. 1 and a cylinder main body.

A preferred embodiment of a position detecting sensor according to the present invention will be described below with reference to the accompanying drawings. In FIG. 4 and in FIGS. 5A through 5D, only a portion of a cylinder main body (actuator) 40 is shown schematically in the vicinity of a region where a sensor attachment groove 42 is formed in the cylinder main body 40.

The position detecting sensor 10 according to the embodiment of the present invention is mounted on an outer surface of the cylinder main body 40, which includes a piston (not shown) in which a magnet is installed.

Figure 1:
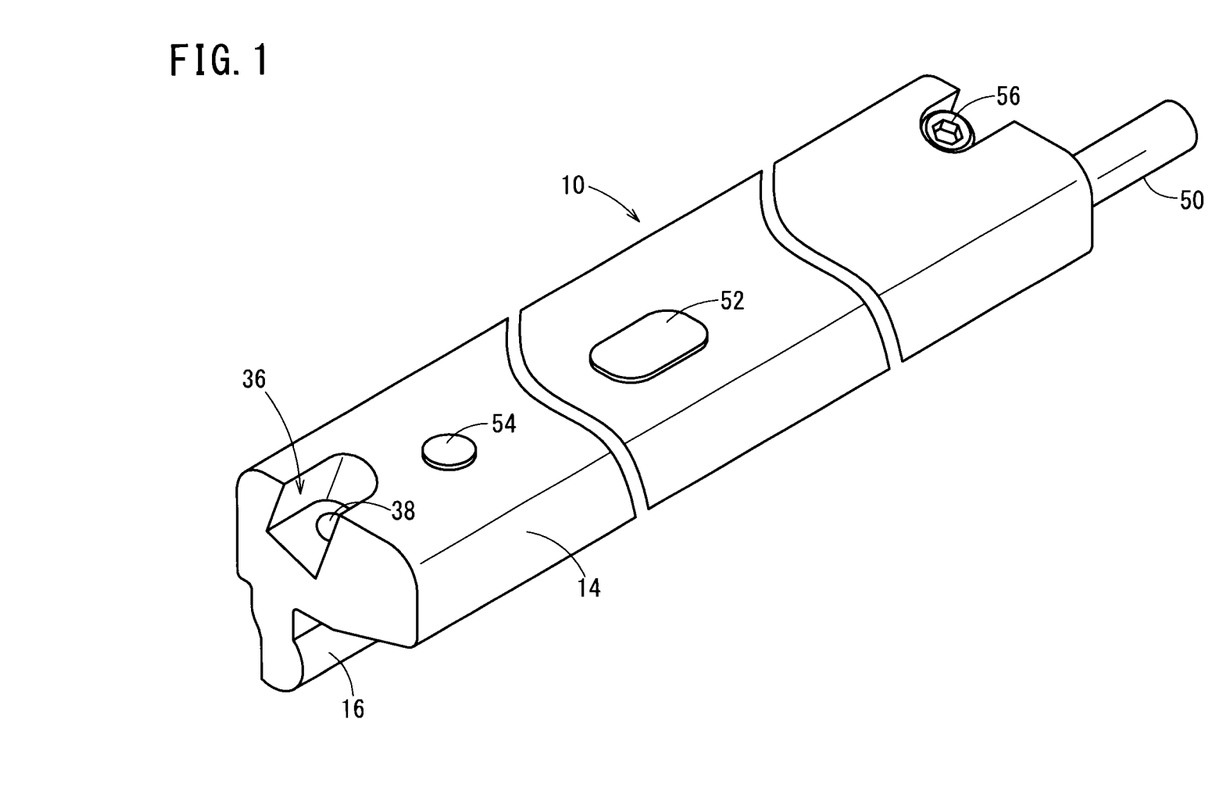
FIG. 1 is a perspective view of the position detecting sensor according to an embodiment of the present invention.
Figure 2:
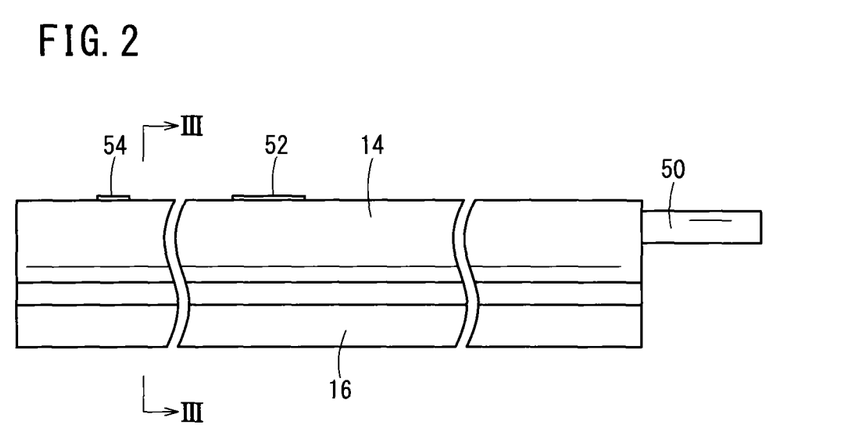
FIG. 2 is a front view of the position detecting sensor shown in FIG. 1.
Figure 3:
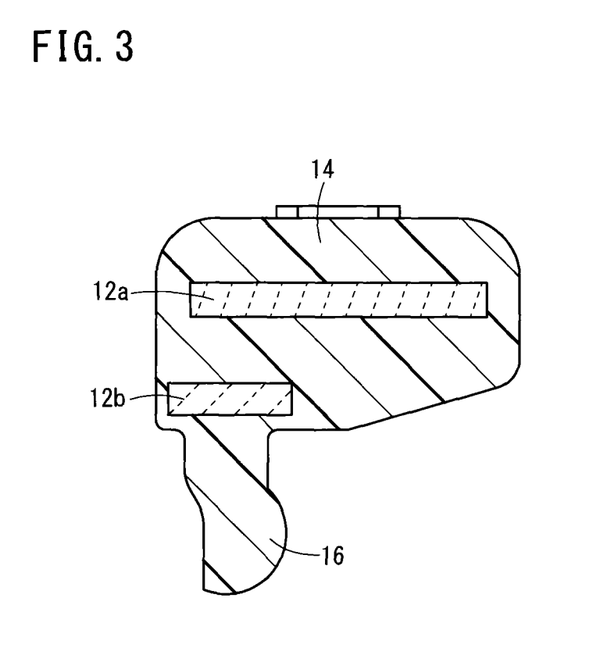
FIG. 3 is a cross-sectional view taken along line III-III of FIG. 2.

As shown in FIGS. 1 through 3, the position detecting sensor 10 includes an elongate housing 14 and a guide member 16. The housing 14 houses a circuit board 12a incorporating circuitry for a signal processing system, and a circuit board 12b in which a magnetic sensor (not shown) is incorporated. A guide member 16 projects out from the housing 14 and extends over substantially the entire longitudinal length of the housing 14. The housing 14 and the guide member 16 are integrally molded from a single resin material. In particular, in order for the position detecting sensor 10 indicated by the present embodiment to linearly detect the condition of displacement of the piston, which moves reciprocally in the interior of the cylinder main body 40, from one end to the other end thereof, the position detecting sensor 10 possesses a length that is slightly shorter than the length of the cylinder main body 40 in the axial direction. For this purpose, multiple magnetic sensors are arranged on the circuit board 12b at equal intervals substantially along the entire length thereof.

As shown in FIG. 4, the housing 14 includes a first side surface 18 and a first bottom surface 20, which are substantially perpendicular to each other, and further includes a second bottom surface 22, which intersects obliquely with respect to the first bottom surface 20. A top part of the first side surface 18 and a terminal end portion of the second bottom surface 22 are connected by an upper surface 21, which is substantially parallel with the first bottom surface 20, and a second side surface 23, etc., which is substantially parallel with the first side surface 18.

The guide member 16 includes a first guided surface 24 having a planar shape and which extends substantially vertically downwardly from the first bottom surface 20 of the housing 14, and a second guided surface 26, which is separated a predetermined distance from the first guided surface 24 in parallel therewith. A terminal end portion of the first guided surface 24 is connected to a third guided surface 28 that bulges outwardly while being curved in the direction of extension of the second bottom surface 22. On the other hand, the second guided surface 26 is connected to a fifth guided surface 32 that lies substantially parallel with the second guided surface 26, through a fourth guided surface 30 which is bent and slanted gently from the terminal end portion of the second guided surface 26 in a direction to approach the first guided surface 24 and is thereafter slanted in a direction to become parallel again with the second guided surface 26. A terminal end portion of the third guided surface 28 is connected to a terminal end portion of the fifth guided surface 32. Owing to this feature of the invention, a cross-sectional widthwise center line 34 of the guide member 16 is drawn in the form of a gently meandering line.

As shown in FIG. 1, on both ends in the longitudinal direction of the housing 14, U-shaped cutout portions 36 are formed at ends of the upper surface 21, and attachment holes 38, which penetrate through the fourth guided surface 30 and the fifth guided surface 32, are formed in bottom surfaces of the cutout portions 36. Female threads are formed on inner surfaces of the attachment holes 38. As also shown in FIG. 1, fasteners 56 having male threads thereon are capable of being threaded into the attachment holes 38.

As shown in FIG. 4, in the cylinder main body 40 that makes up the actuator, the sensor attachment groove 42 is formed that opens on a side surface 58 thereof, and extends over the entire length in the axial direction. The sensor attachment groove 42 is formed from a first guiding surface 44 extending vertically downwardly from the side surface 58 of the cylinder main body 40, a second guiding surface 46 extending vertically downwardly and lying parallel with the first guiding surface 44, and a third guiding surface 48 having a circular shape and which mutually connects terminal end portions, respectively, of the first guiding surface 44 and the second guiding surface 46.

An interval between the first guided surface 24 and the second guided surface 26 is substantially equal to a maximum wall thickness between the third guided surface 28 and the fifth guided surface 32, and is slightly less than the opening width of the sensor attachment groove 42, i.e., the interval between the first guiding surface 44 and the second guiding surface 46. On the other hand, a radius of curvature of the third guided surface 28 of the guide member 16 is substantially equal to a radius of curvature of the third guiding surface 48 of the sensor attachment groove 42.

In the drawings, reference numeral 50 indicates a lead wire that supplies necessary electric power to electronic components of the magnetic sensor and other components that are mounted on the circuit boards 12a, 12b, and for reading out position detecting signals for the piston as detected by the magnetic sensor. Additionally, reference numeral 52 indicates an operating unit for turning the position detecting sensor 10 on and off, and reference numeral 54 indicates an LED that displays an operating state of the position detecting sensor 10.

The position detecting sensor 10 according to the present embodiment is constructed basically as described above. Next, operations and effects of the position detecting sensor 10 will be described with reference to FIG. 4 and FIGS. 5A through 5D. It will be understood that the upward and downward directions in FIGS. 5A through 5D are not limited to the vertical direction.

Figure 5A:
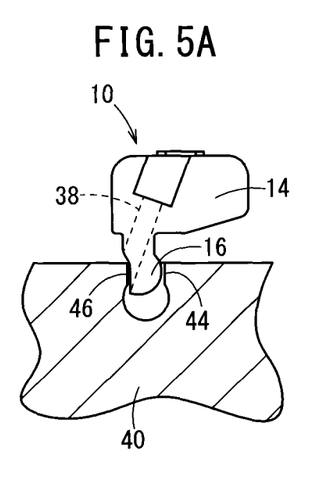
FIGS. 5A through 5D are views showing a procedure for attaching the position detecting sensor shown in FIG. 1 to the cylinder main body.
Figure 5B:
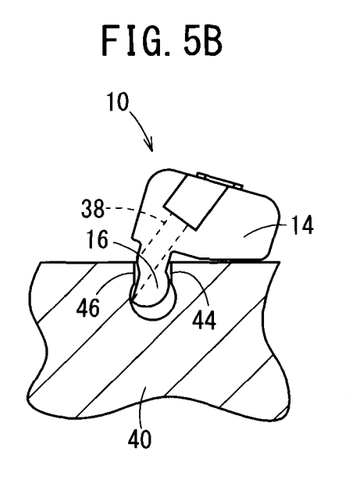
Figure 5C:
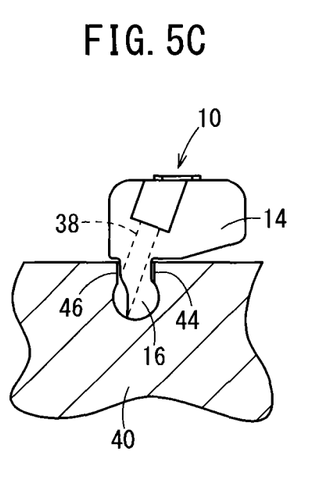
Figure 5D:
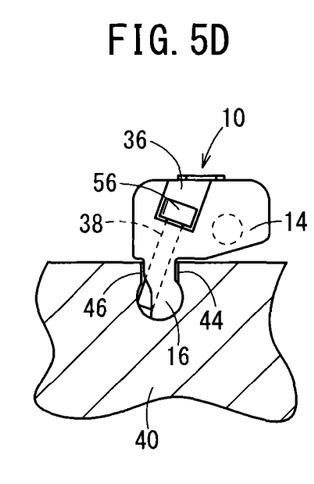

When the position detecting sensor 10 is attached to the elongated cylinder main body 40, the fifth guided surface 32 of the guide member 16 follows along the second guiding surface 46 of the sensor attachment groove 42, and the distal end of the guide member 16 is inserted straight into the sensor attachment groove 42 (see FIG. 5A). The entirety of the fifth guided surface 32 is inserted into the sensor attachment groove 42, and at a position at which the fourth guided surface 30 comes into abutment against the opening edge of the second guiding surface 46, the guide member 16 is pressed into the sensor attachment groove 42 (see FIG. 5B) while the position detecting sensor 10 is subjected to tilting little by little (i.e., rotating clockwise in the figures). Then, when the second bottom surface 22 of the housing 14 comes into a state of being adjacent substantially in parallel with the side surface 58 of the cylinder main body 40, the position detecting sensor 10 is returned to its original orientation (i.e., is rotated counterclockwise in the figures) (see FIG. 5C).

At this time, the first guided surface 24 and the second guided surface 26 of the guide member 16 are placed adjacent to and in a parallel positional relationship with the first guiding surface 44 and the second guiding surface 46, respectively, of the sensor attachment groove 42. In addition, the third guided surface 28 of the guide member 16 is fitted substantially without gaps against the third guiding surface 48 of the sensor attachment groove 42. Further, the first bottom surface 20 of the housing 14 is placed in abutment substantially in parallel with the side surface 58 of the cylinder main body 40. In this state, the male-threaded fasteners 56 are screw-inserted into the attachment holes 38 of the housing 14, and the distal ends of the fasteners 56 project out a predetermined amount from a border region between the fourth guided surface 30 and the fifth guided surface 32 of the guide member 16, and are brought into abutment against the third guiding surface 48 of the sensor attachment groove 42 (see FIG. 5D). When this is done, rotation of the position detecting sensor 10 is prevented, and the third guided surface 28 of the guide member 16 is pressed into contact against the third guiding surface 48 on the side of the first guiding surface 44 of the sensor attachment groove 42, whereby the attachment thereof is completed. A case has been described in which distal end portions of the fasteners 56 project out from a border region between the fourth guided surface 30 and the fifth guided surface 32. However, depending on where the attachment holes 38 are arranged, the distal end portions thereof may project out from either one of only the fourth guided surface 30 or the fifth guided surface 32.

For removal of the position detecting sensor 10 from the cylinder main body 40 in order to carry out maintenance or the like, an opposite procedure to attaching the position detecting sensor 10 to the cylinder main body 40 may be performed.

More specifically, at first, the fasteners 56 are retracted while the screw-engaged state thereof is loosened (unscrewed), at least up to a point at which the distal ends of the fasteners 56 are pulled inwardly from the fourth guided surface 30 and the fifth guided surface 32 of the guide member 16. Next, the position detecting sensor 10 is tilted (rotated clockwise) so that the second bottom surface 22 of the housing 14 is made substantially parallel with the side surface 58 of the cylinder main body 40, and so that portions of the first guided surface 24 and the second guided surface 26 of the guide member 16 slip out from the sensor attachment groove 42. Then, when the second bottom surface 22 of the housing 14 comes into a state of being adjacent substantially in parallel with the side surface 58 of the cylinder main body 40, the position detecting sensor 10 is tilted little by little in the opposite direction (i.e., being rotated counterclockwise), and the position detecting sensor 10 is pulled out from the sensor attachment groove 42. In this manner, the position detecting sensor 10 can be removed from the cylinder main body 40.

As discussed above, the position detecting sensor 10 cannot be separated from the cylinder main body 40 unless the position detecting sensor 10 is subjected to a tilting (rotating) operation in one direction, and then is subjected to a tilting (rotating) operation in a direction opposite to the one direction. For this reason, after the guide member 16 has been inserted into the sensor attachment groove 42, in a condition prior to application of the fasteners 56, the position detecting sensor 10 is prevented from unintentionally falling out, for example, when an operation is carried out to adjust the position of the position detecting sensor 10 with respect to the longitudinal direction of the sensor attachment groove 42. In particular, even in the case that the cylinder main body 40 is placed and oriented with the axial line thereof oriented horizontally, such that the opening of the sensor attachment groove 42 is directed sideways or downwardly, there is no concern that the position detecting sensor 10, in a provisionally assembled state, will become separated from the sensor attachment groove 42 due to the intrinsic weight of the position detecting sensor 10 or due to vibrations.

According to the position detecting sensor 10 of the present embodiment, since the position detecting sensor 10 can be inserted in a direction intersecting with the axial direction of the cylinder main body 40 for attachment of the position detecting sensor 10 to the cylinder main body 40, there is no need to provide a wide operating space to facilitate mounting of the position detecting sensor 10, in the axial direction of the cylinder main body 40. In addition, for detaching the guide member 16 from the sensor attachment groove 42, since an operation of rotating the guide member 16 in one direction and then rotating in a direction opposite to the one direction is required, in a provisionally assembled state prior to application of the fasteners 56, there is no fear that the position detecting sensor 10 will fall out unintentionally from the sensor attachment groove 42.

Further, the cutout portions 36 are formed in both ends in a longitudinal direction of the housing 14, and the attachment holes 38 for the fasteners 56 penetrate through the guide member 16 from bottom surfaces of the cutout portions 36. Therefore, the position detecting sensor 10 can be fastened in a stable manner. Further, heads of the fasteners 56 are accommodated in the cutout portions 36, so that the fasteners 56 do not project outwardly from the housing 14.

In the present embodiment, although the guide member 16 is formed across substantially the entire length in the longitudinal direction of the housing 14, alternatively, guide members may be formed only at locations where the attachment holes 38 for the fasteners 56 are disposed. Further, although the attachment holes 38 are provided on both ends in the longitudinal direction of the housing 14, an attachment hole 38 may be provided in one location only, for example, in a central position in the longitudinal direction of the housing 14. Moreover, although the housing 14 is formed from a single resin together with the guide member 16, the housing 14 may be constituted from a hollow hard resin having an accommodating space therein for the circuit boards 12a, 12b, and a soft resin with which the accommodating space is filled.

The position detecting sensor according to the present invention is not limited to the above-described embodiment, and it goes without saying that various additional or modified structures may be adopted therein without departing from the scope of the invention as set forth in the appended claims. For example, in the present embodiment, although an example has been presented in which a fluid pressure cylinder is used as an actuator, the actuator is not limited to such a cylinder. For example, an electric actuator can also be used. Further, the principles of the invention can be applied to a linear guide type of actuator.

What is claimed is:

1. A position detecting sensor, which is mounted in a sensor attachment groove that opens on a side surface of an actuator and extends in an axial direction of the actuator, comprising:

a housing that houses a sensor main body; and
a guide member inserted into the sensor attachment groove, wherein
the guide member is of a shape such that, when the guide member is inserted into the sensor attachment groove, the guide member is required to be rotated in one direction around an axis parallel with an axis of the actuator and then rotated in a direction opposite to the one direction,
after the guide member has been inserted into the sensor attachment groove, attachment thereof to the sensor attachment groove is completed by application of a fastener,
the sensor attachment groove comprises
a first guiding surface having a planar shape and which extends vertically downwardly from a side surface of the actuator;
a second guiding surface separated a predetermined distance from the first guiding surface and lying parallel with the first guiding surface; and
a third guiding surface that is curved in an arcuate shape and mutually connects terminal end portions, respectively, of the first guiding surface and the second guiding surface,
the guide member comprises
a first guided surface having a planar shape and which extends vertically downwardly from the housing;
a second guided surface separated a predetermined distance from the first guided surface and lying parallel with the first guided surface;
a third guided surface that bulges in an arcuate shape and is connected to a terminal end portion of the first guided surface;
a fourth guided surface that is connected to the second guided surface, slants in a direction to approach the first guided surface, and thereafter, slants in a direction to become parallel again with the second guided surface; and
a fifth guided surface that is connected to the fourth guided surface and is substantially parallel with the second guided surface,
a terminal end portion of the third guided surface is connected to a terminal end portion of the fifth guided surface,
an interval between the first guided surface and the second guided surface is substantially equal to a maximum wall thickness between the third guided surface and the fifth guided surface, and is slightly less than an interval between the first guiding surface and the second guiding surface, and
a radius of curvature of the third guided surface is substantially equal to a radius of curvature of the third guiding surface.

2. The position detecting sensor according to claim 1, wherein:
the actuator is a cylinder apparatus;
the cylinder apparatus includes a piston in which a magnet is installed, in an interior of a cylinder main body; and
plural magnetic sensors are accommodated in the housing along a longitudinal direction of the housing.

3. The position detecting sensor according to claim 1, wherein the fastener is a male screw thread.

4. The position detecting sensor according to claim 1, wherein the time when the guide member starts being inserted into the sensor attachment groove is a time when at least a portion of the guide member starts crossing an entrance of the sensor attachment groove.

5. The position detecting sensor according to claim 1, wherein an attachment hole for the fastener is formed to penetrate through the guide member from a side of the housing opposite to the guide member.

6. The position detecting sensor according to claim 5, wherein:
- cutout portions are formed in both ends in a longitudinal direction of the housing; and
- the attachment hole penetrates through the guide member from a bottom surface of each of the cutout portions.

* * * * *